July 4, 1967

A. GOLDSMITH 3,329,398

RESILIENT VALVE SEAT

Filed Sept. 30, 1963

INVENTOR.
AVE GOLDSMITH

BY *Head & Johnson*

ATTORNEYS

July 4, 1967 A. GOLDSMITH 3,329,398
RESILIENT VALVE SEAT
Filed Sept. 30, 1963 2 Sheets-Sheet 2

*INVENTOR.*
AVE GOLDSMITH
BY
*Head & Johnson*
ATTORNEYS

United States Patent Office 3,329,398
Patented July 4, 1967

3,329,398
RESILIENT VALVE SEAT
Ave Goldsmith, Tulsa, Okla., assignor to The Hale Company, Tulsa, Okla., a corporation of Ohio
Filed Sept. 30, 1963, Ser. No. 312,709
5 Claims. (Cl. 251—306)

This invention relates to a valve and more particularly, to a butterfly valve. Still more particularly, the invention relates to improvements in a butterfly valve of the type utilizing a resilient seat including means wherein the resilient seat is not indented by the engagement by the valve disc, thus providing a valve which, while effectively sealing when in the closed position, is much easier to open and close than other types of resilient seat butterfly valves.

Butterfly valves have, in recent years, become exceedingly popular in all types of industrial applications. A favorite type of arrangement includes valves having a resilient tubular seat within which a metal disc is rotated to open and close the valve. This type of valve arrangement has several advantages, including economy of construction, effective sealing, long life and dependability. One disadvantage which has arisen is that in the closed position the valve disc presses, at the total periphery thereof, against and into the resilient seat. This resilient engagement is necessary in order to obtain effective sealing. Most types of resilient material, such as rubber, and including the synthetic materials, have a tendency to take a "set" under this peripheral pressure of the valve disc, that is, a permanent distortion of the valve seat occurs. The peripheral area of the disc engaging the resilient seat tends to embed into and, thus, permanently distort the resilient material. When a resilient seat has taken a set by the imposition of peripheral pressure of the valve disc and an attempt is made to open the valve by rotation of the disc, it is found that a relatively great force is required to move or rotate the valve disc out of the groove or indentation formed in the resilient seat.

The only method known in the past of minimizing this tendecy of the resilient seat to take a set has been to reduce the amount of interference between the disc and the seat, that is, reduce the diameter of the disc relative to the resilient seat. This naturally results in diminished effectiveness of the valve to close and seal against higher pressures.

It is accordingly an object of this invention to overcome the problems existing in present resilient seat butterfly valves.

A more specific object of this invention is to provide a butterfly valve of the resilient seat, metal disc type including means whereby the metal disc does not form a groove or indentation in the resilient seat of the valve regardless of the amount of time the valve remains closed and regardless of the resilient force applied by the seat against the periphery of the metal disc.

Another object of this invention is to provide a butterfly valve including improved valve disc pivoting means.

Another object of this invention is to provide a butterfly valve having an improved resilient seat.

Another object of this invention is to provide a butterfly valve having an improved resilient seat supported by a removable liner.

Another object of this invention is to provide a butterfly valve having improved characteristics, the improved characteristics including simplicity of design, improved performance, greater pressure sealing, reduced torque requirements encountered in closing and especially in opening the valve, and improved economy of construction.

These and other objects and a better understanding of the invention may be had by referring to the following description and claims taken in conjunction with the attached drawings in which:

This invention may be described as an improved butterfly valve. More particularly, but not by way of limitation, the invention may be described as a valve comprising a body having an opening therethrough, a resilient tubular seat member supported in said opening, said seat member having an integral, reduced internal diameter cylindrical seating portion defined in part by a cylindrical uninterrupted seating surface of specific width as the width is measured parallel the tubular axis of said seat member, a cylindrical disc member rotatably supported in said opening in said body, said disc member having a circumferential uninterrupted seating area defined in part by a peripheral cylindrical seating surface of specific width as the width is measured parallel the cylindrical axis of the disc member, the seating surface of said resilient seat member having uninterrupted circumferential engagement with the seating surface of said disc member when said disc member is in closed position, the width of the said seating surface of said disc being substantially equal to or greater than the said width of the seating surface of said resilient seat member, and means of rotating said disc member.

Figure 1:
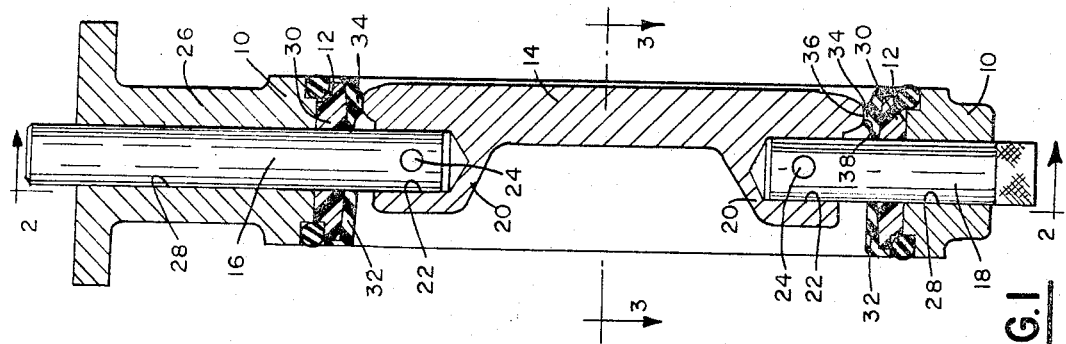
FIGURE 1 is a cross sectional view of the butterfly valve of this invention shown in closed position.

Referring now to the drawings and first FIGURE 1 a butterfly valve of this invention is shown in cross section. The valve, as shown in FIGURE 1, is of the type designed, when installed for service, to be interposed between a pair of flanges in a manner wherein the flanges are typically bolted together to support the valve therebetween. This type of arrangement is so well-known in the art that the flanges are not shown. The valve consists basically of a body member 10 which has a cylindrical opening 12 therethrough. Pivotally supported within opening 12 is a disc member 14. A variety of ways are available for pivotally supporting disc 14. In the arrangement shown in FIGURE 1 the disc is supported about an upper stem 16 and a lower stem 18. Bosses 20, integrally extending from the disc 14, each have an end receiving opening 22 therein receiving the upper and lower stems 16 and 18. Retaining pins 24 may be provided to affix the stems 16 and 18 to the valve disc 14.

At a point on the external periphery of the body member 10 an integral stem guide 26 is provided having stem opening 28 therein by which a portion of the upper stem 16 extends exteriorly of the valve. The exteriorly extending portion of stem 16 provides a means for the pivotation of disc 14 for opening and closing the valve. Gaskets, such as O-rings, although not shown, will normally be provided in openings 28 to prevent the leakage of fluid past stems 16 and 18.

Supported in the opening 12 of the body member 10 is a removable valve seat made up of two parts, the parts being a liner 30 having bonded thereto a resilient, substantially tubular seat 32. An important feature of this invention is the configuration of the resilient seat 32 particularly when taken in combination with the configuration of the disc 14.

The resilient seat 32 is provided with an integrally formed reduced internal diameter seating area 34. The seating area 34 is defined in part by an inner peripheral cylindrical seating surface 36 of specific width, the width ing measured parallel the tubular axis of the tubular silient seat 32. Formed on the periphery of the disc is a cylinder seating surface 38. Disc seating surface is of a specific width as the width is measured parallel e cylindrical axis of the disc. In the closed position the valve disc, seating surface 38 has uninterrupted ntact with seating surface 36 of resilient seat 32.

Figure 2:
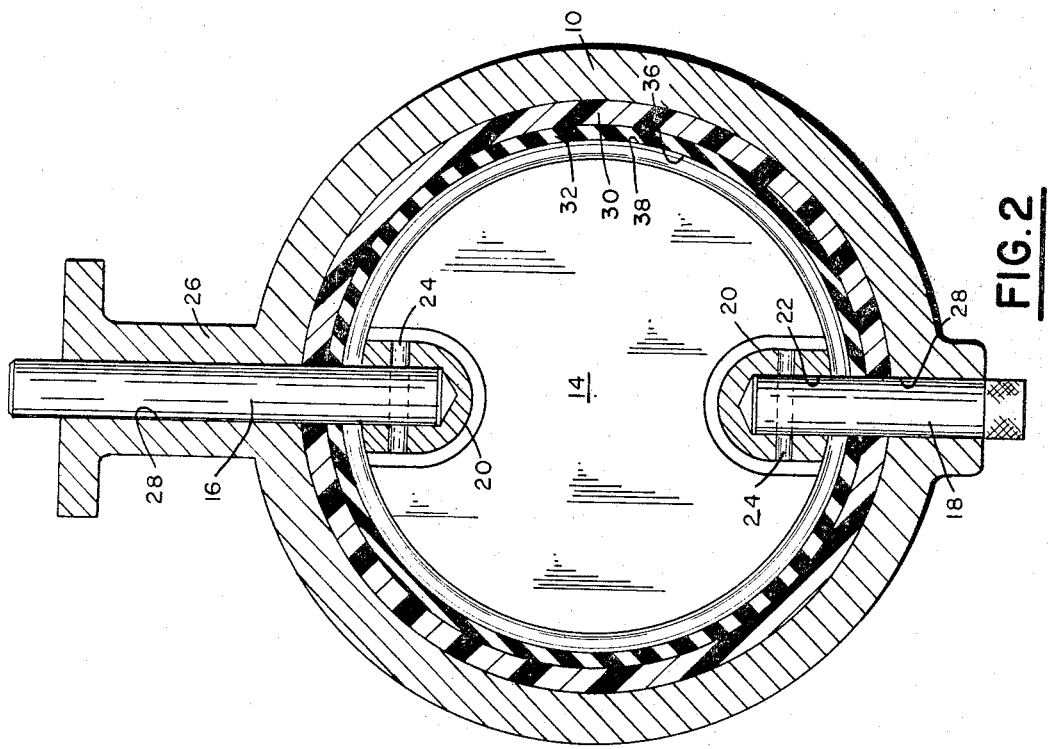
FIGURE 2 is a cross sectional view taken along the line 2—2 of FIGURE 1.
Figure 3:
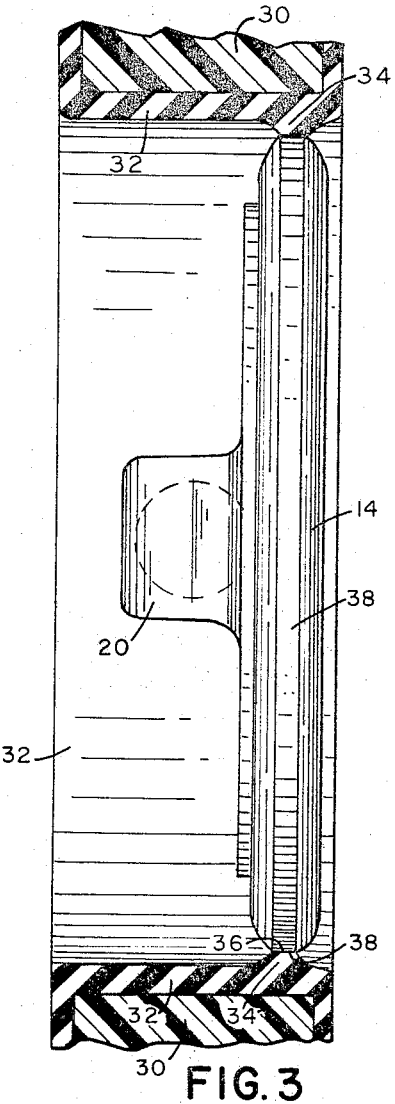
FIGURE 3 is a cross sectional view taken along line 3—3 of FIGURE 1 showing the valve in closed position.

The width of the seating surface 38 on disc 14 is bstantially equal to or greater than the width of the ating surface 36 of resilient seat 32. The circumferenal diameter of the seating surface 38 of disc 14 is ightly larger than the normal noncompressed internal rcumferential diameter of seating surface 36 of the silient seat 32 so that when disc 14 is in closed posion, as shown in FIGURES 1, 2, and 3, and the seating rfaces 36 and 38 are in full engagement with each her, the seating area 34 of the resilient seat 32 is ompressed. By the unique provision of the raised or reuced diameter seating area 34 terminating in the cylinrical seating surface 36 of a width equal to or less than e seating surface 38 of the disc 14, means is accomlished whereby the possibility of the seating surface of isc 14 becoming embedded in the resilient seat 32 is liminated. Regardless of the resilient compression caused y the movement of disc 14 to the closed position and gardless of the length of time the valve is maintained 1 closed position, it is impossible for the resilient seat 2 to take a groove or indentation which would restrict the otation of the disc out of closed position.

The expression "specific width" as used in this description in reference to seating surfaces 36 and 38 means at these surfaces have width determined by design reuirements and that the width of each is important relative o the other.

FIGURE 3 is a slightly enlarged cross sectional view howing the valve in closed position. It can be seen hat regardless of the length of time and of the compresive force applied to the resilient seat 32 in the unique deign of the valve of this invention, the peripheral seating urface 36 cannot take an indentation or groove which vould prevent the disc from being moved out of closed osition. The contact of seating surface of disc 14 against he resilient seat 32 is always and only against the seating urface 36 of the raised seating area 34 which, as has een previously mentioned, is substantially equal to or ess than the width of seating surface 38. This means hat there is no opportunity for the expansion of the reilient seat 32 to either side of the seating area 38 of he disc and therefore, no resilient material can build up and form shoulders on either side of seating surface 38.

In the preferred embodiment of the invention, as set forth in the drawings, disc 14 is supported by an upper tem 16 and a lower stem 18. It can be seen that disc 14 can equally as well be supported by a single continuous tem. When a continuous stem is utilized bosses 20 may oe omitted in which case the disc 14 would be affixed directly to the stem. The primary advantage in the provision of an upper and lower stem is that less restriction to flow is interposed when the valve is in the full open or near full open position.

An additional advantage of the design of the valve of this invention is the location of the valve stem, whether separated into an upper stem 16 and a lower stem 18 or whether a single continuous stem is utilized, whereby the stem is displaced away from the peripheral seating surface 38 of the disc. By the off setting of the axis of pivotation of the disc, the disc acts as a cam. This has several advantages. First, when the disc is rotated to the opened position, the disc almost immediately moves out of all contact with the seating surface 36 of the resilient seat 32. This is only true in the design of the resilient seat 32 of this invention having the raised seating area 34. By this more immediate removal of contact between disc 14 as it is opened, less scuffing and wear on the seat is encountered. Second, as the disc is moved to closed position, as illustrated best in FIGURE 4, the disc "climbs over" seating area 34 of resilient seat 32 and exerts mainly radial compression forces as compared with tangential scuffing and shear distortion with conventional type butterfly valve seats. The third advantage is that when disc 14 is moved to the open position, the off center positioning of the disc axis immediately moves 180° of the circumferential seating surface 38 out of compressive engagement with the seat. This substantially reduces the torque required to open the valve.

A more specific description of the action of the valve, during opening and closing, will now be given, together with the advantages accruing therefrom.

When the disc 14 is revolved to the closed position, the half of the disc seating surface which is approaching the resilient seat 36 on the side nearest the stem has to climb the raised portion 34 of the resilient seat and depress it slightly more than it is depressed after the disc reaches full closed position. However, the large radius on the side of the disc near the seating surface and a small radius which connects this radius with the seating surface both assist in this action. The narrow raised portion 34 of the resilient seat 32 assists because it can deflect sideways ahead of the disc slightly and can also bulge on the shoulder away from the disc slightly. By contrast, conventional resilient seats can only provide space for the disc by bulging ahead of it which interferes with its movement. Furthermore, the deformation of the resilient seat by the disc is a progressive action starting at the points on the seat nearest to the stem line and ending at the point on the disc farthermost from the stem. As each point on the disc seating surface slips up onto the seating surface of the resilient seat, the distortion and the frictional force are reduced. Since the relatively severe distortion of the resilient seat is only temporary, it will not produce any permanent set.

The above describes the action of only half of the disc as the valve is revolved to the closed position. The other half of the disc seating surface, which is approaching the resilient seat on the side away from the stem, moves into contact with the resilient seat in a very efficient combination of compression and sliding and this likewise is a progressive action. As a result, it might be expected that this type of resilient seated valve would operate with about one-half the torque of conventional valves and tests indicate this to be so.

When the disc revolves from the closed position, the action of the seating surface is even more efficient. The half of the disc which moves toward the stem, moves with a combined compression and sliding action, while the half of the disc which moves away from the stem, moves with a very favorable lifting and sliding action. The torque in a resilient seat butterfly valve, which has been closed for some time, tends to be very high due to interlocking of the highly compressed rubber with microscopic irregularities of the metal and to the displacement of any fluid that might tend to lubricate the surfaces. Therefore, the characteristics of the resilient seat and disc combination of this invention, which tend to make opening easier than closing, are most advantageous.

It can be seen that the resilient seat 32 can be vulcanized directly to the opening 12 in body 10, if desired. The preferred embodiment, as shown in FIGURE 1, includes the provision of a removable liner 30 to which the resilient seat 32 is bonded. Liner 30 may be constructed of metal, plastic, hard rubber or the like. The provision of a removable liner facilitates repair of the valve when the resilient seat 32 is worn.

Figure 4:
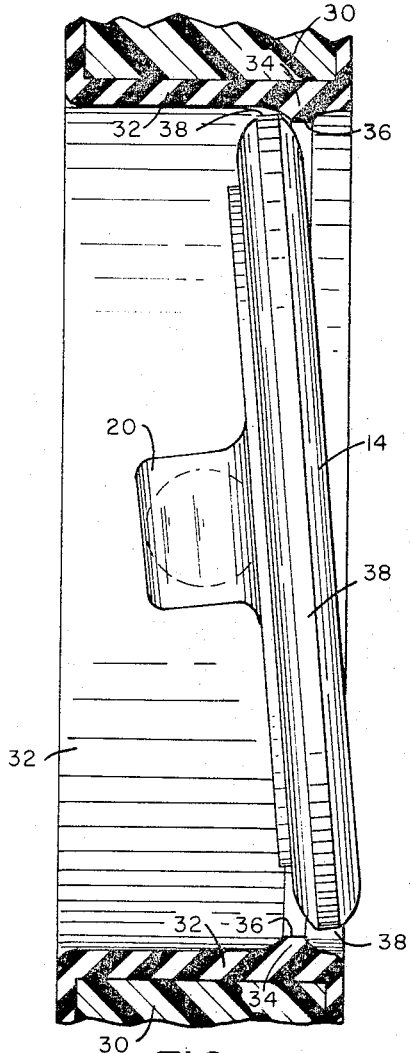
FIGURE 4 is a cross sectional view substantially equal to the view of FIGURE 3 but showing the valve in slightly open position.
Figure 5:
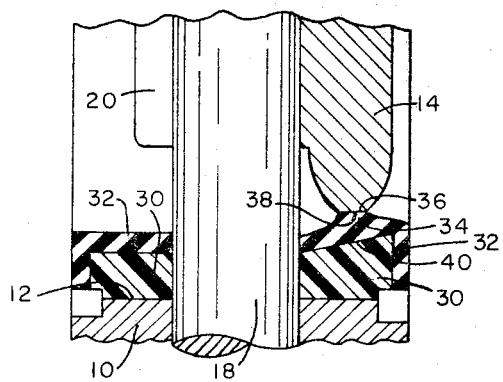
FIGURE 5 is an enlarged fragmentary view of the valve seat of this invention showing an alternate arrangement.

The liner 30 may have a variety of cross sectional configurations. As shown in FIGURE 1, the liner 30 in cross section slopes upwardly to a reduced intternal circumferential diameter. In FIGURES 3 and 4, the liner 30 is shown with a flat internal circumferential surface. FIGURE 5 shows in an enlarged fragmentary cross sectional view, an alternate arrangement wherein the liner 30 is provided with an inclined internal circumferential surface 40 in the area directly beneath the seating area 34 of resilient seat 32. These various configurations suggest that others can be devised all within the purview of this invention. In the same manner, the configuration of the disc 14 may vary, but as long as the disc 14 and resilient seat 32 provides an arrangement wherein an integral raised portion or seating area 34 terminates in a seating surface 36 which mates with a similar width or wider seating surface 38 on disc 14, the basic concept of the invention is attained.

The drawings of this disclosure show the disc 14 supported by coaxial stems 16 and 18 displaced from the plane of the disc. As above indicated, this is the preferred embodiment, however, it is to be understood that the improved resilient seat and disc configuration of this invention may be advantageously employed in butterfly valves of the known design wherein the axis of rotation of the disc is in the plane of the seating face of both the disc and the resilient liner, and such an arrangement is within the purview of this invention.

In the drawings and description of this disclosure, the seating surfaces 36 and 38 have each been described as being cylindrical. This is the preferred embodiment due to the obvious reason of simplicity of manufacture. The seating surfaces 36 and 38 may, in addition, each be formed as segments of a cone. Any arrangement providing a resilient seating surface 36, which is not grooved or indented by disc seating surface 38, is within the terms of this invention.

Although this invention has been described with a certain degree of particularity, it is manifest that many changes may be made in the details of construction and arrangement of components of the valve set forth herein without departing from the spirit and scope of this disclosure.

What is claimed:

1. A butterfly valve comprising:
a valve body having a bore therethrough;
a tubular resilient seat member supported in said bore, said seat member having an integral reduced internal diameter seating portion, said integral seating portion defined in a cross-section thereof in a plane of the tubular axis by progressively reduced width in the direction towards the said axis, forming a pair of first cooperating surfaces, and terminating in a flat disc engaging seating surface bridging the said pair of cooperating surfaces, said reduced internal diameter seating portion being resiliently radially compressible and substantially laterally nondisplaceable;
a disc having a circumferential diameter greater than the normal non-compressed internal circumferential diameter of the said integral seating portion, and pivotally supported in said bore of said body, said disc defined in part by a peripheral seating surface of substantially cylindrical configuration, the said seating surface of said disc sealably engaging said seating surface of said resilient seat when the disc is in closed position, the width of said cylindrical disc engaging surface of said resilient seat member, as measured parallel the tubular axis thereof, being substantially equal to or less than the width of said cylindrical peripheral seating surface of said disc as measured parallel the cylindrical axis of said disc and a pair of second cooperating surfaces, commencing at the edge of said cylindrical peripheral seating surface and defined in a cross section thereof in a plane of the said tubular axis by progressively increased width in a direction towards the said axis; and means of pivoting said disc in said body.

2. A valve according to claim 1 including a tubular rigid liner member, removably supported in said bore in said body, said tubular resilient seat member being supported to the interior circumference of said rigid liner member.

3. A valve according to claim 1 including an upper and a lower stem member rotatably supported by said body member about a common axis, said disc member being rotatably supported by said upper and lower stem members, the plane of the said seating surface of said disc member being displaced from the parallel plane of the axis of said stem members.

4. A valve according to claim 1 including a unitary stem member rotatably supported by said body member, said stem member being supported in a plane substantially perpendicular to the tubular axis of said opening in said body member, said disc member being affixed to said stem member, the plane of said seating surface of said disc member being displaced from the parallel plane of the axis of said stem member.

5. A valve according to claim 4 wherein said disc engaging seating surface of said tubular resilient seat member is internally circumferentially uninterrupted.

References Cited

UNITED STATES PATENTS

| | | | |
|---|---|---|---|
| 1,824,168 | 9/1931 | Orton | 251—306 X |
| 2,586,927 | 2/1952 | Fantz | 251—306 |
| 2,994,342 | 8/1961 | Stillwagon | 251—306 X |
| 3,081,791 | 3/1963 | Wheatley | 251—306 X |
| 3,118,465 | 1/1964 | Scarmucci | 137—454.2 |
| 3,215,400 | 11/1965 | Muller | 251—306 |

FOREIGN PATENTS 695,037    9/1964    Canada.

M. CARY NELSON, *Primary Examiner.*

MARTIN P. SCHWADRON, *Examiner.*

R. C. MILLER, *Assistant Examiner.*